(12) United States Patent
Wales

(10) Patent No.: X4761
(45) Date of Patent: May 18, 1827

(54) STOVES, AIR FUNNEL

(76) Inventor: Hiram Wales

Hiram Wales' Letters Patent

The Schedule referred to in these Letters Patent & making part of the same, containing a description in the words of the said Hiram Wales himself of his improvement in stoves, called "Wales' air funnel stove".

---

Be it known that I Hiram Wales of Randolph, in the County of Norfolk, & State of Massachusetts, have invented a new & improved Stove for heating rooms by warm air, called "Wales' air funnel Stove"; specified as follows to wit;– The body of the Stove may be of sheet or cast iron, of any size or form, & placed upon legs as usual. The model accompanying this specification is cylindrical, having a furnace door & air hole in front.– Inside of this stove, & near the back is a tube of cast or wrought iron passing thro' the bottom & top of the Stove.– This is the air tube, & may (if required) be extended below so as to connect with the external air out of the house.– The hole in the top of the stove thro' which the air tube passes is made so much larger than the tube, so that the smoke from the stove may escape all around it, into the smoke pipe or chimney; which smoke pipe is securely fixed on the top of the stove. At the joint of the first loose length of this pipe, is a hole made sufficiently large to admit of a horizontal continuation of the air tube to pass out from the smoke pipe and to be terminated or continued wherever desired.

The operation is as follows: when fire is kindled in the Stove, the air tube being heated thereby causes the rarefied & heated air to rush upwards, & thro' the tube described above, wherever it is wished to convey it.– Thus the heat of a room may be regulated to almost any temperature, & a great saving of fuel secured.–

Witnesses
Thomas W. Tolman
A. E. Dubois

Hiram Wales (350 words)